United States Patent [19]
Bartlett

[11] Patent Number: 5,283,560
[45] Date of Patent: Feb. 1, 1994

[54] COMPUTER SYSTEM AND METHOD FOR DISPLAYING IMAGES WITH SUPERIMPOSED PARTIALLY TRANSPARENT MENUS

[75] Inventor: Joel F. Bartlett, Los Altos, Calif.

[73] Assignee: Digital Equipment Corporation, Maynard, Mass.

[21] Appl. No.: 720,881

[22] Filed: Jun. 25, 1991

[51] Int. Cl.$^5$ ............................................. G09G 5/14
[52] U.S. Cl. ................................... 345/113; 345/146; 345/902
[58] Field of Search ............... 340/710, 709, 731, 721, 340/747, 729, 734; 395/156, 159, 160, 135

[56] References Cited

U.S. PATENT DOCUMENTS

| | | | |
|---|---|---|---|
| 4,587,520 | 5/1986 | Astle | 340/710 |
| 4,686,522 | 8/1987 | Hernandez et al. | 340/709 |
| 4,700,320 | 10/1987 | Kapur | 340/731 |
| 4,752,893 | 6/1988 | Guttag et al. | 340/747 |
| 4,827,253 | 5/1989 | Maltz | 340/703 |
| 4,931,783 | 6/1990 | Atkinson | 340/721 |
| 4,954,970 | 9/1990 | Walker et al. | 395/135 |
| 4,991,122 | 2/1991 | Sanders | 340/731 |
| 4,992,781 | 2/1991 | Iwasaki et al. | 340/721 |
| 5,016,191 | 5/1991 | Radochonski | 395/166 |

OTHER PUBLICATIONS

Tinney, Byte, Feb. 1989, pp. 235-244 "The Current Crop".

MacPaint, Macintosh, 1983, 3 sheets of MacPaint user manual.

Primary Examiner—Alvin E. Oberley
Assistant Examiner—Steve Saras
Attorney, Agent, or Firm—Flehr, Hohbach, Test, Albritton & Herbert

[57] ABSTRACT

A computer display control system displays semi-transparent control menus superimposed over other images. The computer system has a central processing unit, a program memory that stores an application or operating system program that generates and displays a first set of images on the display, and a menu generating program that displays a control menu having a list of menu items. The displayed control menu is a stippled image that is partially transparent. When the control menu is superimposed over the first set of images, the first set of images remains visible on the display below the control menu. The menu generating program logically ANDs predefined control menu images with a halftone screen so as to generate a stippled control menu image comprising an array of interleaved transparent and non-transparent pixels. In the preferred embodiment, the menu generating program displays a first version of the control menu when the control menu is unselected and a second version when said control menu is selected. The first version has a higher percentage of transparent pixels than the second version, making the control menu less intrusive during normal use when the menu is unselected, and also making the control menu easier to see distinctly when it is selected.

25 Claims, 10 Drawing Sheets

304 — Button background
306 — Button text
— Button outline

COMPUTER SYSTEM AND METHOD FOR DISPLAYING IMAGES WITH SUPERIMPOSED PARTIALLY TRANSPARENT MENUS

The present invention relates generally to systems and methods for displaying graphic images, and particularly to methods and systems for displaying program control menus without blocking other images on a computer's monitor.

BACKGROUND OF THE INVENTION

Figure 1:
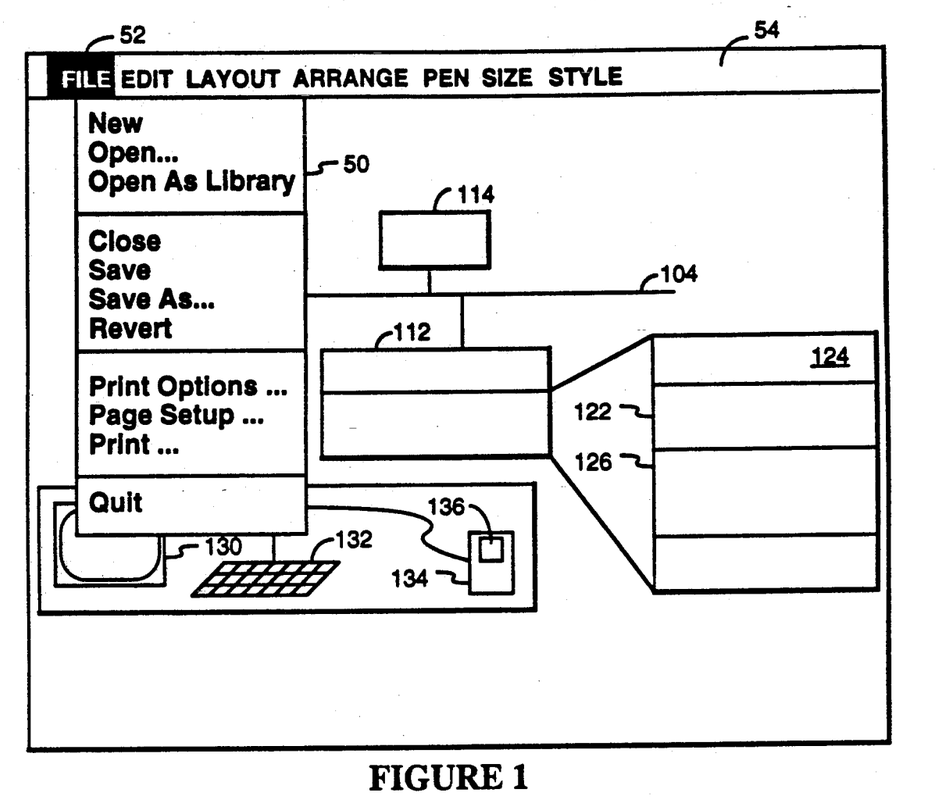
FIG. 1 depicts a prior art pull-down menu that blocks a portion of the image on a computer's display.

A wide variety of computer systems and computer programs use pull-down menus. An example of a pull down menu, from the MacDraw II.1 program published by Claris, is shown in simplified form in FIG. 1. The "File" pull-down menu 50 has been activated by pointing to the File menu item "button" 52 in the top menu bar 54, and then selecting that item (typically using a mouse pointer device). In this particular program, the pull-down menu is automatically removed when the user releases the button on the mouse pointer device. As shown, while the menu is active, ft blocks a portion of the displayed image. More specifically, the pull-down menu is displayed inside an opaque "box" or window that blocks all other images in the portion of the display that is occupied by the pull-down menu.

Typically, pull-down menus are implemented as an object or window that, when activated, blocks out whatever other images happen to fall below the activated menu. Thus, if the pull down menu is a rectangular object containing a list of options, all images falling below the menu's rectangular object are blocked. This is entirely standard, and is so widely accepted that k is normally not perceived as being a problem.

Some applications provide moveable control menus, sometimes called tear-off menus. These menus can be positioned by the computer user anywhere on the monitor display. Unfortunately, prior art tear-off menus, like prior art pull-down menus, block any image failing below the current position of the displayed menu. As a result, the computer user must use the mouse (or other means) to move the tear-off menu to a region of the display that is not too close to the underlying image. This menu repositioning takes time and effort, and briefly diverts the user's attention from the more important task of actually using the menu, or working with the underlying image.

Another type of prior art is the popup menu. When the user clicks a mouse button on a certain area of a drawing, an opaque menu appears under the mouse pointer.

There is a need for a control menu that does not block other images on a computer monitor. Such a menu could be positioned anywhere on the display, permitting a user to activate the menu without first having to move a cursor to the periphery of the display. Further, since such a menu would not require dedicated space at the periphery of the display, application programs could display larger underlying images that filled the entire display.

SUMMARY OF THE INVENTION

In summary, the present invention is a computer display control system that displays semi-transparent control menus that may be superimposed over other images on a system display. The computer system includes the monitor or display, a central processing unit (CPU), and a program memory. The program memory stores an application program or operating system program that generates and displays a first set of images on the display, and also stores a menu generating program that displays a control menu having a list of menu items. The control menu may be a pull-down menu or a tear-off menu, and is displayed as a stippled image that is partially transparent. When the control menu is superimposed over the first set of images, the first set of images remains visible on the display below the control menu.

The menu generating program logically ANDs predefined control menu images with a halftone screen. As a result, a stippled control menu image is generated that comprises an array of interleaved transparent and non-transparent pixels. In the preferred embodiment, the menu generating program displays a first version of the control menu when the control menu is unselected, and a second version when the control menu is selected. The first version has a higher percentage of transparent pixels than the second version. This makes the control menu less intrusive during normal use (while the menu is unselected), and also makes the control menu easier to see distinctly when it is selected.

It is an objective of the present invention to display a control menu that does not block other displayed images, and that does not required dedicated space on the display. This objective is met by the stippled, semi-transparent menu described herein.

It is a further objective of the present invention to permit a control menu to be positioned on the display so as to minimize the motion required by the computer user to activate the menu. This objective is met by the disclosed stippled, semi-transparent menu, which may be positioned anywhere on the display without obscuring an underlying image.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 2:
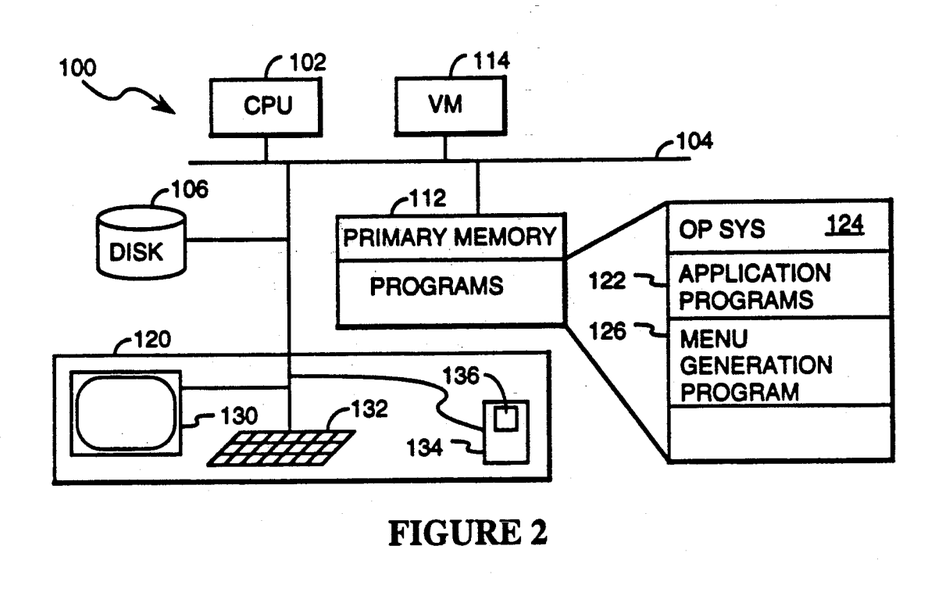
FIG. 2 is a block diagram of a computer system with which the present invention may be practiced.

Referring to FIG. 2, there is shown a computer system 100 having a central processing unit 102 that is interconnected by a system bus 104 to secondary memory 106 (e.g., magnetic disk storage devices), to primary memory 1 1 2 (i.e., high speed, random access memory), to virtual memory manager 114, and to one or more user interfaces 120. Stored in primary memory 112 are currently executing application programs 122, as well as operating system software 124, and a menu generating program 126 that operates in accordance with the present invention to generate a semi-transparent control menu. Each user interface 120 typically includes a display or monitor 130, keyboard 132, and a mouse pointer device 134 (or any other equivalent pointer device) with an item selection button 136.

Figure 3A:
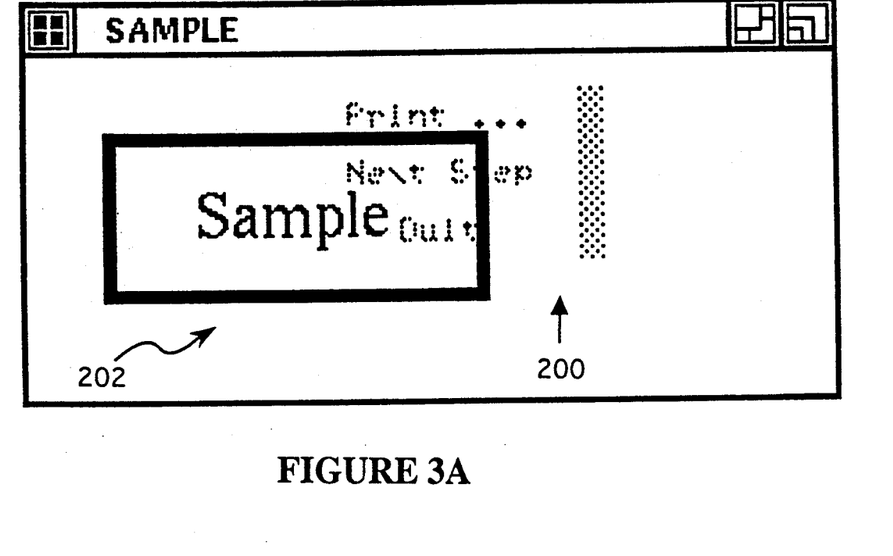
FIG. 3A depicts a semi-transparent control menu according to the present invention, partially overlying an image.

FIG. 3A shows the display 130 whereon a semi-transparent control menu 200 is partially superimposed on a first image set 202 that is generated by the application program 122. Although control menu 200 is readable, ft is not opaque and is not displayed in an opaque box or window like the example shown in FIG. 1. As a resoft, portions of the first image set 202 that underlie the control menu 200 are plainly visible. By contrast, a prior art opaque menu image would typically require relocation to an available peripheral region of the display, the lower right corner, for example. Such relocation would distract the user for a few seconds while the mouse 134 (or other device) was used to relocate the menu.

Figure 3B:
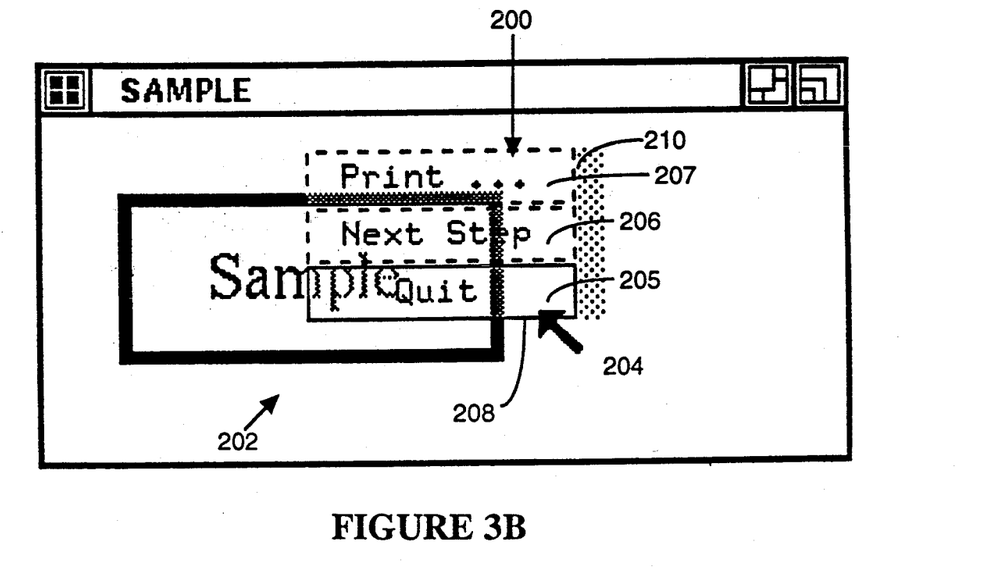
FIG. 3B depicts the menu enhancement that occurs when the cursor enters the semi-transparent control menu shown in FIG. 3A.

FIG. 3B depicts a portion of the control menu 200 enhanced (e.g., less-transparent) because the cursor 204 has entered one of the control button regions 205, 206, 207, thereby activating the menu. More specifically, each button representing a control menu option ("Print", "Next Step", etc.) defines a control button region that is surrounded by a button outline 208. Each control menu item or button region typically is coupled to a portion of the application program 122 or a portion of the operating system 124, and selection of a menu item causes execution of a corresponding task or software routine.

Collectively each button region may be grouped together as a button set within the controlled menu. The button outline is normally invisible (as in FIG. 3A) until part of the button set becomes activated in response to the cursor's proximity.

For example, in FIG. 3B, the cursor 204 is sufficiently close to the button outline 208 surrounding the "Quit" control button region 205. Thus, the button outline 208 is displayed as a solid box, and the button outlines surrounding the other control button regions 206, 207 are also displayed, but less prominently, using a stippled mask. Note that the underlying first image 202 remains plainly visible through the control menu 200.

Figure 3C:
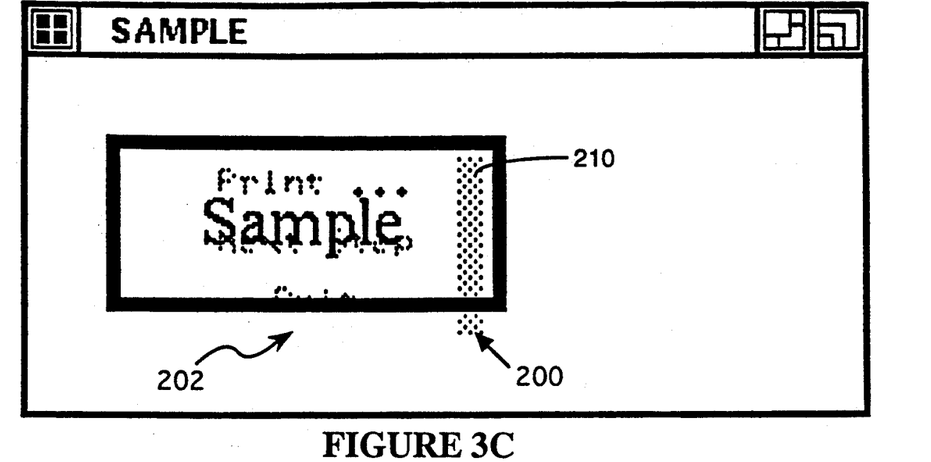
FIG. 3C depicts a semi-transparent control menu overlying an image.
Figure 3D:
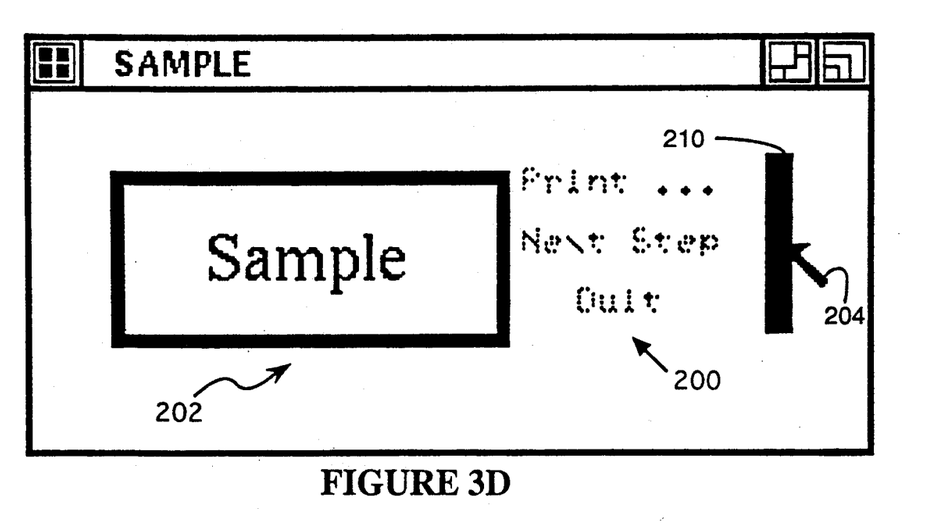
FIG. 3D depicts the semi-transparent control menu of FIG. 3C being dragged toward the right side of the display.

FIGS. 3C and 3D together show a semi-transparent and overlying control menu image 200 before and after it is dragged to the right by the cursor 204, which activates the vertical drag bar 210. Because ft is activated, the drag bar image 210 in FIG. 3D is less transparent than in FIG. 3C. However because the cursor is not in close proximity to any of the button outline boxes surrounding the various control buttons, the button outlines remain invisible. Thus, since the control menu has not been activated (except for the drag bar), the control menu is displayed equally transparent in FIGS. 3C and 3D.

Figure 3E:
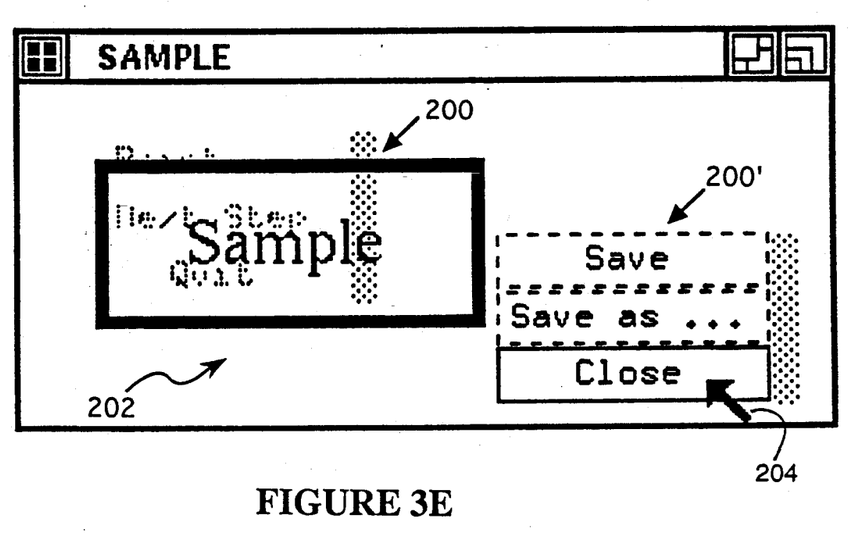
FIG. 3E depicts two semi-transparent control menus according to the present invention, one of which is selected and one of which is not selected.

The present invention readily permits displaying multiple controlled menus. For example, FIG. 3E depicts a display having a first image 202, and two semi-transparent control menus 200, 200', according to the present invention. Menu 200' is shown activated by the cursor 204, and therefore appears less transparent because it contains more non-transparent pixels than the non-activated menu 200.

Figure 4:
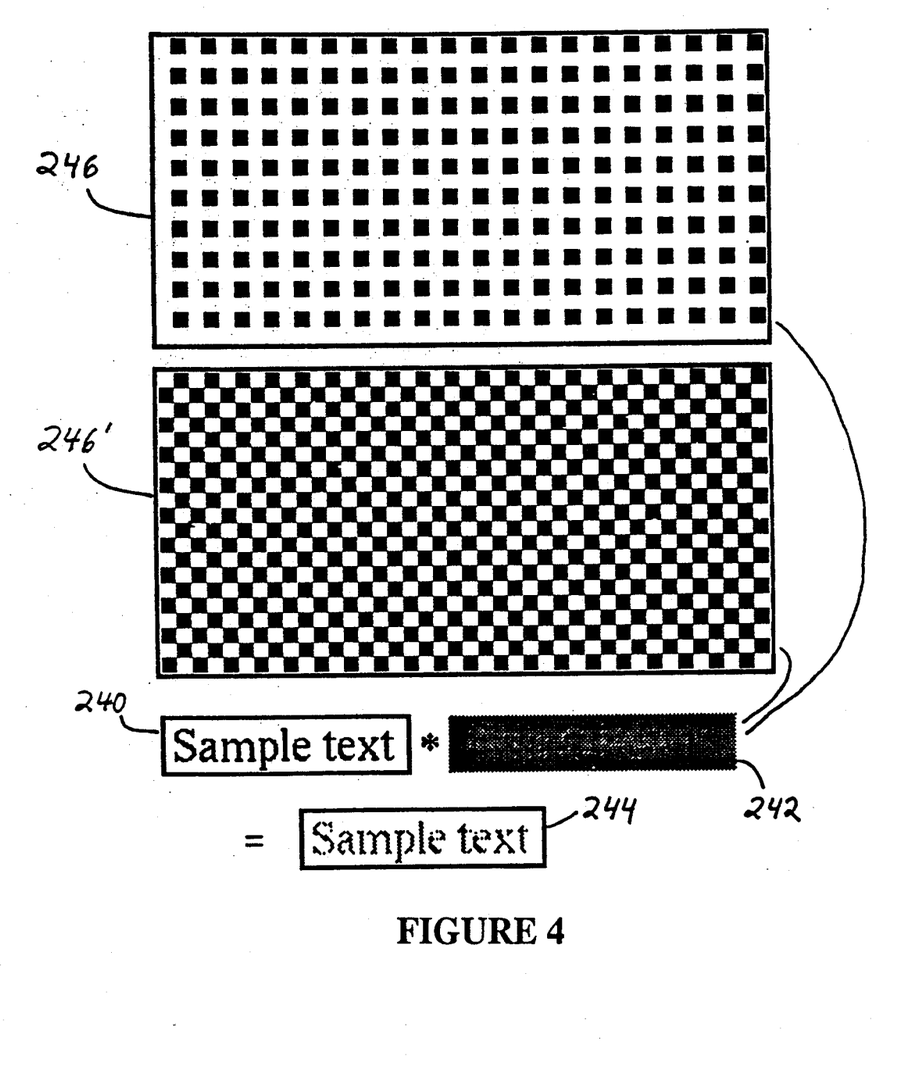
FIG. 4 schematically depicts the process of generating a controllably semi-transparent control menu, according to the present invention.

Referring to FIG. 4, the menu generating program generates each semi-transparent control menu by logically ANDing a normal, opaque, control menu image 240 with a halftone screen or first mask 242. The ANDing generates a stippled control menu image 244 having an array of interleaved transparent and non-transparent pixels.

For the purposes of this document, a "transparent" pixel is a pixel in an image that does not block any underlying image. Thus, when an image with transparent pixels is positioned above other objects in a displayed image, the image's transparent pixels have no affect on what is displayed at those pixel positions, whereas the image's non-transparent pixels overwrite and thereby block any underlying image. As will be explained below, in the preferred embodiment transparency is implemented by using a mask to control, on a pixel by pixel basis, which pixels in an image are written into the system's pixel and display buffers.

Pixels defined by the mask as being transparent are not written into the system's pixel and display buffers, while opaque pixels are written into these buffers.

A detailed enlargement of one portion (i.e., one square box) of the first halftone screen 242 is shown as 246. Enlargement 246 shows a mesh pattern wherein only one pixel out of three is dark. To present an enhanced or less transparent menu upon activation, a second halftone screen 242' (not shown) having a denser matrix of pixels is used in the ANDing process in place of screen 242. A detailed enlargement of one portion of screen 242' is shown in FIG. 4 as 246', wherein one out of two pixels is dark. If the "Sample Text" control menu image 240 is ANDed with the denser pixel pattern 242', the resultant control menu image 244' (not shown) will appear bolder, or enhanced, because it includes more opaque pixels and is therefore less transparent.

Although halftone screens 242, 242' are represented in FIG. 4 as different patterns of black and white pixels (see 246, 246'), it is understood that the pixels in screen 242 might be a first color (gray and white, for example) and the pixels in screen 242' might be a second color (blue and white, for example). In fact, if screens 242 and 242' contain differently colored pixels, the same pixel pattern could be used for each screen, for example, the pattern shown for screen 242.

Although the preferred embodiment uses different stipple patterns 242, 242' to enhance a selected, or activated, menu, those skilled in the art will appreciate that different colors could be used instead or in addition. For example, an unselected control menu could be displayed in gray, which display turns to blue upon activation or selection.

Figure 5A:
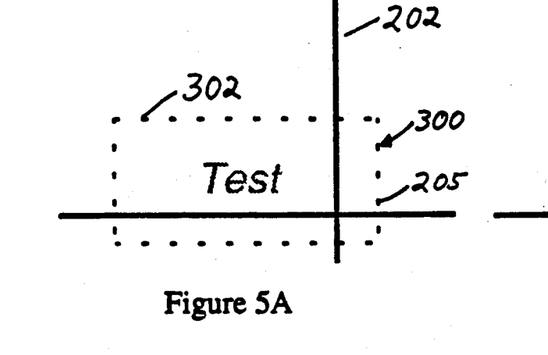
FIGS. 5A-5E depict various display states for a transparent pushbutton, or other user controlled object, according to the present invention.
Figure 5B:
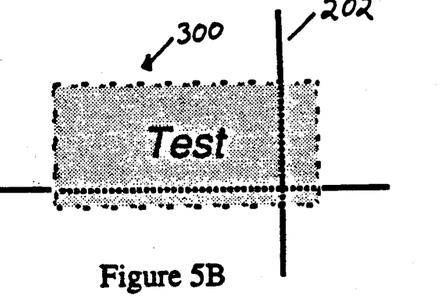
Figure 5C:
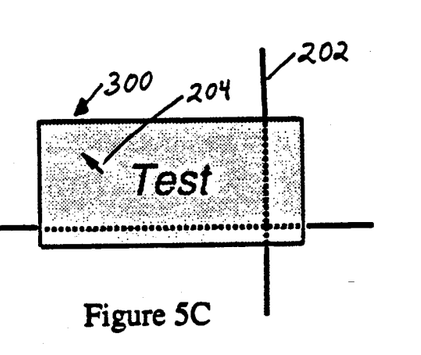
Figure 5D:
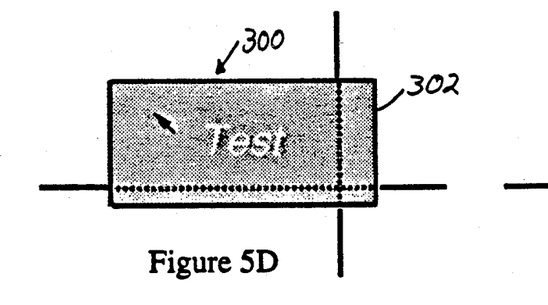
Figure 5E:
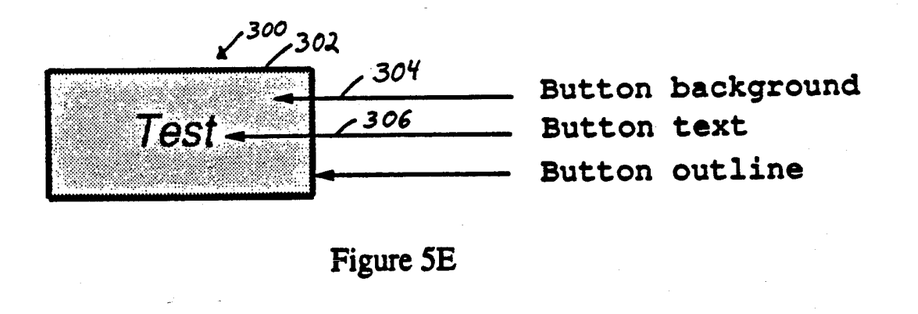

FIGS. 5A–5E demonstrate various display states for a pushbutton region of a control menu, according to a preferred embodiment of the present invention. The nomenclature to be used is shown in FIG. 5E, wherein a pushbutton region 300 includes a button outline 302, a button background 304 that fills the outline 302, and button text 306. As noted, the pushbutton region 300 typically is a member of a larger button set that presents the user with various menu options. The bounding box for the button region 300 may be coincident with the button outline 302, or ft may be somewhat larger.

FIG. 5A depicts a portion of a user's first image 202 covered by a "Test" button 300 image. Button 300 is depicted in an initial, semi-transparent, state because the cursor is neither in the button (defined by the button bounding box 205, shown here slightly larger than the button outline 302), nor in an associated button set. Therefore the button outline 302 is drawn as a doffed line, the text is drawn with the first stipple pattern 242, and the background is not drawn at all. The result is a semi-transparent button 300 that does not obscure the underlying image 202.

In FIG. 5B, the cursor is in a member of the associated button set (not shown). The text and button outline for the "Test" button 300 remain as in FIG. 5A, but the background 304 is now drawn with a stipple pattern. Although button 300 is enhanced, the underlying image 202 remains visible.

In FIG. 5C, the cursor 204 has been moved by the user through the bounding box 205, into the "Test" button 300. Assuming that the mouse button 136 is not pressed, the display state is similar to that of FIG. 5B except that the button outline 302 is now preferably drawn as a solid line. If the user now presses the mouse button, the resultant display state will be as shown in FIG. 5D, wherein the text color and background color are preferably reversed. If the user releases the mouse button, the displayed image will revert to that of FIG. 5C.

While the preferred embodiment produces the above-described visual changes in response to the user's mouse commands, alternative visual changes or indeed fewer changes could also be implemented. Further, while FIGS. 5A–5E depict various display states for a button contained in a control menu, the present invention can produce such changes in any user activated object image.

Figure 6A:
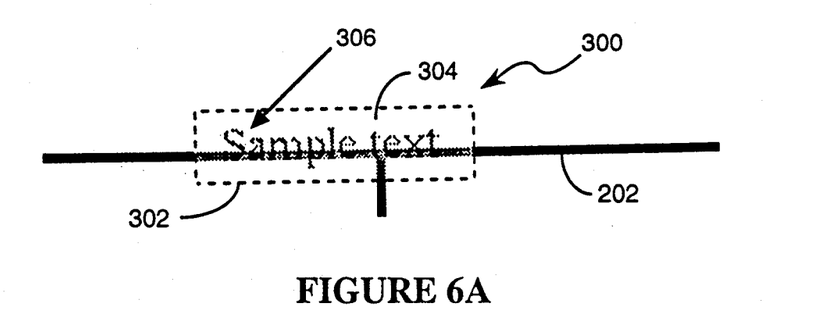
FIG. 6A depicts an activated semi-transparent control menu image overlying an image.
Figure 6B:
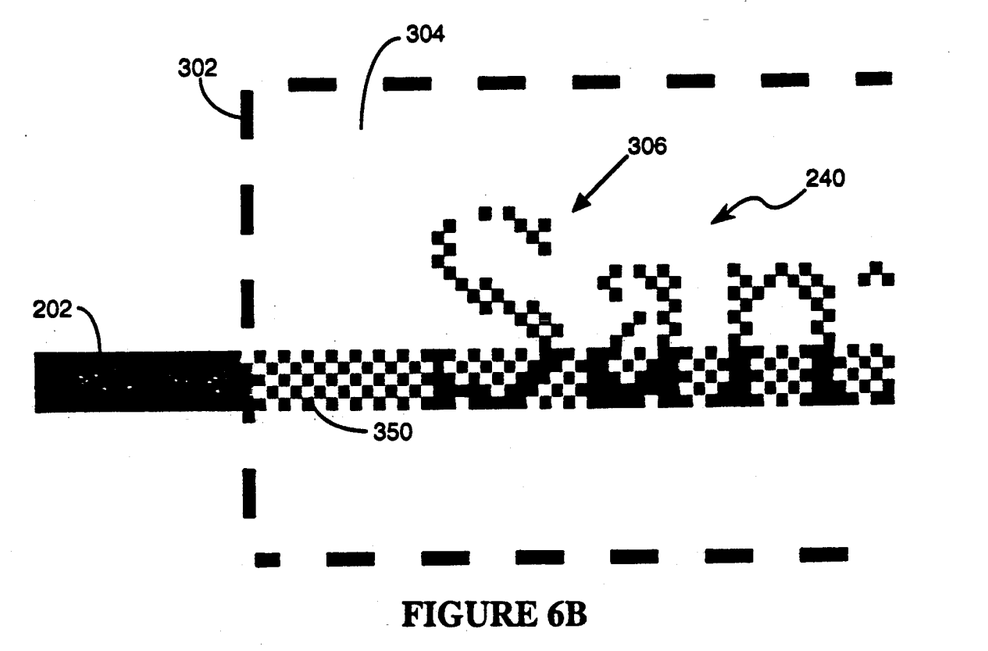
FIG. 6B is a close-up of a portion of FIG. 6A.

FIG. 6A depicts a button region 300 superimposed on a first image 202 having a horizontal and vertical line. This depiction is similar FIG. 5B in that the cursor is understood to be on a member of the button set that includes button 300. Although white in appearance, the button background 304 is actually drawn with a stippled pattern in FIG. 6A. The enlarged view shown in FIG. 6B illustrates the effect of this stippled background pattern. Because the image of the button 300 is uppermost on the display, any portions of the first image 202 contained within the button outline 302 are viewed through the stippled background pattern 304. This causes such portions of the first image as 350 to appear stippled, thereby enhancing the legibility of the button text 306.

Figure 7:
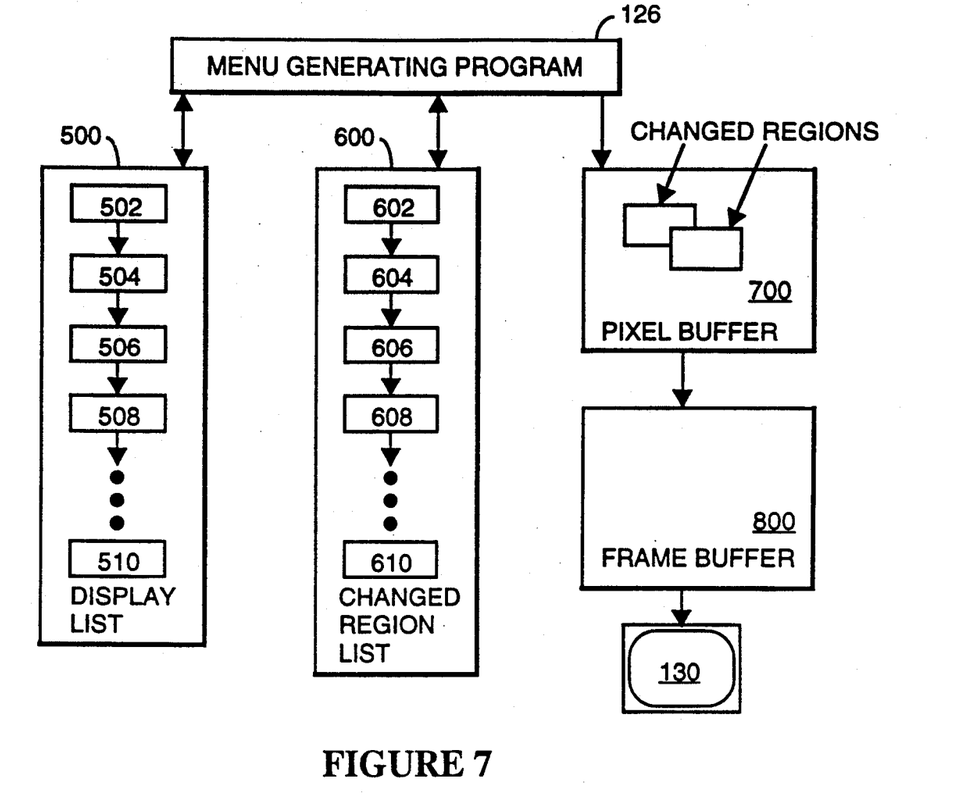
FIG. 7 is a schematic depiction of the data structures implementing a preferred embodiment of the present invention.
Figure 8:
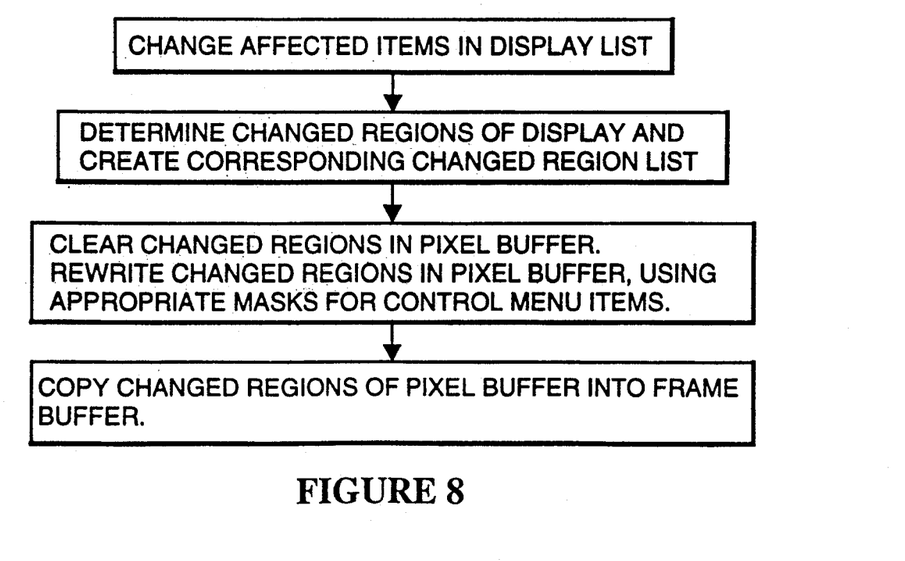
FIG. 8 is a flowchart corresponding to the schematic depiction of FIG. 7.

FIG. 7 and Appendix 1 respectively are a schematic description of the preferred method of practicing the present invention, and a pseudo code representation of that method. FIG. 8 is a corresponding flowchart. The present invention is implemented using a structured graphics system. Each object to be graphically displayed is defined by an entry in an object list, with objects at the end of the list being displayed over objects that appear earlier in the list. (In the preferred embodiment, the semi-transparent control menu is the uppermost layer displayed and the last hem in the object list.)

The menu generating program provides a method for rendering each object in the object list, and a method for computing the object's bounding box (e.g., the effective perimeter of the object). Preferably, each portion of the control menu is treated as an object, as is the control menu itself. For example, in FIG. 3B, the control button region 205 is treated as an object, defined by its bounding box 204. Further, the drag bar 210 is an object, as is the entire control menu 200. In fact, any object defined by the menu generating program can be made "mouse sensitive", using techniques known to those in the programming arts.

With reference to FIG. 7, the display list 500 is a linked data structure wherein each item 502–510 is an object that is graphically depicted on the display. The last item 510 in the display list 500 might represent the control button 300, shown in FIG. 5A for example. As such, hem 510 will contain the information required to render the control button 300, and to compute its bounding box 205.

When an object is changed, the area formerly defined by the object's bounding box is uncovered, and a new area will be defined by the present location of the bounding box. For example, if a control menu is dragged (as in FIG. 3D), the changed region is defined as the area formerly covered by the control menu, and the new area now under the repositioned control menu.

The menu generating program 126 responds to movement of the control menu (or any other displayed object) by creating a "changed region list" 600, which is a set of items 602–610 defining the areas of the display that need to be redrawn. Typically, if only one object was moved, the changed list comprises two items: a first item representing the bounding box area formerly occupied by the object, and a second item representing the new bounding box area occupied by the moved object. If several objects are moved as a group, the changed list 600 may have more items, depending on the number of separate rectangular regions affected by the move.

With further reference to FIG. 7, a pixel buffer 700 is used much like a scratch pad by the menu generating program 126 to generate new images, while a frame buffer 800 stores the pixel values that are currently being displayed. Before any display object is moved, the contents of the pixel buffer 700 and the display buffer 800 are identical. After the changed region list 600 is created in response to a moved object, the portions of the pixel buffer 700 corresponding to the changed area items 602–610 are cleared.

Next, the menu generating program 126 redraws only the changed display regions in the pixel buffer 700. This is done by first looking at every object in the display list 500. If an object's bounding box overlaps any of the changed regions, that portion of the object is written into the pixel buffer 700. Control menu images are written into the pixel buffer 700 with the appropriate halftone pixel masking, depending upon whether or not the image is to be displayed in enhanced mode. In other words, a mask is defined for each control menu object, and only pixels of the control menu item corresponding to pixels in the mask that are set (i.e., equal "1") are written to the pixel buffer. Pixels of the control menu objects that are masked out (i.e., correspond to pixels in the object's mask that are set to "0") are not written into the pixel buffer, thereby causing the control menu object to appear to be partially transparent.

Finally, the regions of the pixel buffer 700 that correspond to the regions defined by the changed region list 600 are copied into the frame buffer 800 so that the revised image will be displayed on the computer system's monitor. Regeneration of the monitor display is relatively rapid because only those images intersecting the changed object list require redrawing.

In contrast to the prior art, the present invention permits updating changed portions of images, even while they are beneath one or more semi-transparent menus. Such changes will be immediately visible to the user, through the semi-transparent control menu.

The present invention further enables a user to activate portions of the first image 202 that are covered by a semi-transparent control menu 200. For example, the first image 202 might display metal trace routings for an integrated circuit layout. The application program typically allows the user to relocate these routings by mouse command. The present invention permits such trace relocating, even though the traces to be relocated are covered by the semi-transparent control menu. The changes to the underlying image will be immediately visible.

Of course, if the semi-transparent control menu disclosed herein is used to implement changes to an underlying image, these changes will be immediately visible. By contrast, an opaque prior art menu would prevent viewing the underlying image region. Indeed, in the prior art, if an opaque menu was used to generate changes in the underlying image, these changes would not be visible until the opaque menu was moved and the entire underlying image redrawn.

It is noted that the present invention can be used for displaying any user interface object as a partially transparent image. For example, the "sliders" or "scroll bars" used to scroll an image in many applications could be superimposed over other images in accordance with the present invention, instead of using the opaque sliders found in current products.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

```
/* The OBJECT LIST is an ordered list of all graphical objects
    in the window. Each entry defines an object. Each object
    has a method for rendering the object and a method for
    computing the object's bounding box. Objects at the head
    of the list are "below" objects found later in
    the list
    The CHANGED LIST is a list of bounding boxes defining areas of
    the
    window that have been changed.
/*
LOOP:
    /* Change the drawing */
    while (the drawing is being changed) do
        change object definition in object list
        add to the changed list
            the area the object used to occupy, and
            the area that the object now occupies
    /* Clear changed areas in pixel buffer */
```

APPENDIX 1 -continued

```
    p = head of changed list
    while (p ≠ null) do
        clear bounding box in pixel buffer
        p = next p
    /* Redraw changed areas */
    p = head of object list
    while (p ≠ null) do
        if bounding box of p intersects any of the changed
        areas then
            /* Draw p to changed areas of pixel buffer */
            mask = objects's stipple
            for each pixel in object p's rendered image do
                if corresponding pixel is set in mak then
                    copy image pixel to pixel buffer
        p = next p
    /* Copy changed pixels to the frame buffer */
    p = head of changed list
    while (p ≠ null) do
        copy pixels in p's bounding box from the pixel buffer
            to the frame buffer
        p = next p
    changed list = null
    goto LOOP
```

What is claimed is:

1. A computer display control system, comprising:
a central processing unit (CPU);
a program memory, coupled to said CPU, that stores software programs executed by said CPU; and
a monitor, coupled to said CPU, that displays images under the control of said software programs stored in said program memory;
said software programs stored in said program memory including an image generating program that generates and displays a first set of images on said monitor, and a menu generating program that displays a control menu on said monitor;
said menu generating program including means for generating a control menu, stippling said control menu so as to make said control menu partially transparent, and superimposing said control menu over said first set of images displayed on said monitor;
wherein said first set of images, over which said control menu is superimposed, remains visible on said monitor below said control menu.

2. A computer display control system as set forth in claim 1, wherein:
said menu generating program includes means for generating a stippled control menu image comprising an array of interleaved transparent and non-transparent pixels.

3. A computer display control system as forth in claim 1, wherein:
said menu generating program includes means for logically ANDing a predefined control menu image with a halftone screen so as to generate a stippled control menu image comprising an array of interleaved transparent and non-transparent pixels.

4. A computer display control system as set forth in claim 1, wherein:
said menu generating program includes means for displaying a first version of said control menu when said control menu is un-selected and for displaying a second version of said control menu when said control menu is selected;

wherein said second version is displayed visually differently than said first version, indicating thereby selection of said control menu.

5. A computer display control system as set forth in claim 1, wherein:
said menu generating program includes means for displaying a first version of said control menu when said control menu is un-selected and for displaying a second version of said control menu when said control menu is selected;
said first version of said control menu comprising an image with interleaved transparent and non-transparent pixels having a first percentage of non-transparent pixels;
said second version of said control menu comprising an image with interleaved transparent and non-transparent pixels having a second percentage of non-transparent pixels that is greater than said first percentage of non-transparent pixels;
whereby said displayed control menu is less transparent when selected.

6. The computer display control system as set forth in claim 2, further including cursor control means coupled to said computer display control system, said cursor control means controlling the position of a cursor on said monitor;
wherein:
said menu generating program includes means for displaying a first version of said control menu when said cursor doe snot overlap said control menu and for displaying a second version of said control menu when said cursor does overlap said control menu;
wherein said control menu becomes more visually prominent when said cursor overlaps said user interface object.

7. The computer display control system as set forth in claim 6,
said first version of said control menu comprising an image with interleaved transparent and non-transparent pixels having a first percentage of non-transparent pixels;
said second version of said control menu comprising an image with interleaved transparent and non-transparent pixels having a second percentage of non-transparent pixels that is greater than said first percentage of non-transparent pixels;
whereby said displayed control menu is less transparent when said cursor overlaps said user interface object.

8. The computer display control system as set forth in claim 2, further including cursor control means coupled to said computer display control system, said cursor control means controlling the position of a cursor on said monitor;
wherein:
said menu generating program includes means for displaying a first version of said control menu when said cursor is not proximate said control menu and for displaying a second version of said control menu when said cursor is proximate said control menu;
wherein said control menu becomes more visually prominent when said cursor is proximate said user interface object.

9. The computer display control system as set forth in claim 8,
said first version of said control menu comprising an image with interleaved transparent and non-transparent pixels having a first percentage of non-transparent pixels;
said second version of said control menu comprising an image with interleaved transparent and non-transparent pixels having a second percentage of non-transparent pixels that is greater than said first percentage of non-transparent pixels;
whereby said displayed control menu is less transparent when said cursor is proximate said user interface object.

10. A method of controlling operation of a computer system having a central processing unit (CPU), a program memory, a monitor, and a user interface means for selecting displayed menu items; the steps of the method comprising:
storing in the program memory an image generating program that generates and displays a first set of images on the monitor, and a menu generating program that displays on the monitor a control menu;
the CPU, while executing said stored menu generating program, generating a control menu, said generating step including stippling said control menu so as to make said control menu partially transparent, and superimposing said control menu over said first set of images displayed on the monitor;
wherein said first set of images, over which said control menu is superimposed, remains visible on the monitor below said control menu; and
said CPU responding to user selection of an item in said displayed list of menu items by executing a corresponding one of said multiplicity of tasks under control of said image generating program.

11. A method of controlling operation of a computer system as set forth in claim 10, including the step of:
said CPU, under control of said menu generating program, logically ANDing a predefined control menu image with a halftone screen so as to generate a stippled control menu image comprising an array of interleaved transparent and non-transparent pixels.

12. A method of controlling operation of a computer system as set forth in claim 10, including the step of:
said CPU, under control of said menu generating program, displaying a first version of said control menu when said control menu is un-selected and displaying a second version of said control menu when said control menu is selected;
wherein said second version is displayed visually differently than said first version, indicating thereby selection of said control menu.

13. A method of controlling operation of a computer system as set forth in claim 10, including the step of:
said CPU, under control of said menu generating program, displaying a first version of said control menu when said control menu is un-selected and displaying a second version of said control menu when said control menu is selected;
said first version of said control menu comprising an image with interleaved transparent and non-transparent pixels having a first percentage of non-transparent pixels;
said second version of said control menu comprising an image with interleaved transparent and non-transparent pixels having a second percentage of non-transparent pixels that is greater than said first percentage of non-transparent pixels;

whereby said displayed control menu is less transparent when selected.

14. A method of controlling operation of a computer system as set forth in claim 10, said first set of images comprising an array of pixels, and said control menu comprising an image with interleaved transparent and non-transparent pixels having a first percentage of non-transparent pixels;

said method including the steps of:

said CPU, under control of said menu generating program, creating and maintaining a list of objects displayed on the monitor wherein said list defines each object displayed and how each said object is to be rendered on the monitor; and said CPU, under control of said menu generating program, causing said control menu to be maintained at a position of said list representing an uppermost layer of display on the monitor;

said step of superimposing said control menu over said first set of images including the step of overwriting pixels of said first set of images underlying non-transparent pixels of said control menu and leaving unchanged pixels of said first set of images underlaying transparent pixels of said control menu.

15. A method of controlling operation of a computer system as set forth in claim 14, including the step of:

said CPU, under control of said menu generating program, defining a bounding box for each image object displayed on the monitor, said CPU further creating and maintaining a list defining changed areas representing objects whose bounding box has been moved;

said CPU, under control of said menu generating program, using said list defining changed areas to modify a pixel buffer in the computer system so as to cause a frame buffer in the computer system to regenerate only the changed areas.

16. A method of controlling operation of a computer system as set forth in claim 10, said user interface means including cursor control means, said method including the step of positioning a cursor on said monitor using said cursor control means, the manipulation of said cursor control means by a user resulting in a corresponding movement of said cursor on said display;

said menu generating step including displaying a first version of said control menu when said cursor does not overlap said control menu and displaying a second version of said control menu when said cursor does overlap said control menu;

wherein said control menu becomes more visually prominent when said cursor overlaps said user interface object.

17. The method of controlling operation of a computer system as set forth in claim 16, said first version of said control menu comprising an image with interleaved transparent and non-transparent pixels having a first percentage of non-transparent pixels;

said second version of said control menu comprising an image with interleaved transparent and non-transparent pixels having a second percentage of non-transparent pixels that is greater than said first percentage of non-transparent pixels;

whereby said displayed control menu is less transparent when said cursor overlaps said user interface object.

18. The method of controlling operation of a computer system as set forth in claim 10, said user interface means including cursor control means, said method including the step of positioning a cursor on said monitor using said cursor control means, the manipulation of said cursor control means by a user resulting in a corresponding movement of said cursor on said display;

said menu generating step including displaying a first version of said control menu when said cursor is not proximate said control menu and displaying a second version of said control menu when said cursor is proximate said control menu;

wherein said control menu becomes more visually prominent when said cursor is proximate said user interface object.

19. The method of controlling operation of a computer system as set forth in claim 18, said first version of said control menu comprising an image with interleaved transparent and non-transparent pixels having a first percentage of non-transparent pixels;

said second version of said control menu comprising an image with interleaved transparent and non-transparent pixels having a second percentage of non-transparent pixels that is greater than said first percentage of non-transparent pixels;

whereby said displayed control menu is less transparent when said cursor is proximate said user interface object.

20. A computer display control system, comprising:
a central processing unit (CPU);
a program memory, coupled to said CPU, that stores software programs executed by said CPU; and
a monitor, coupled to said CPU, that displays images under the control of said software programs stored in said program memory;

said software programs stored in said program memory including an image generating program that generates and displays a first set of images on said monitor, and a menu generating program that displays a user interface object on said monitor;

said menu generating program including means for generating a user interface object, stippling said user interface object so as to make said user interface object partially transparent, and superimposing said user interface object over said first set of images displayed on said monitor;

wherein said first set of images, over which said user interface object is superimposed, remains visible on said monitor below said user interface object.

21. A computer display control system as set forth in claim 20, wherein:

said menu generating program includes means for generating a stippled user interface object image comprising an array of interleaved transparent and non-transparent pixels.

22. The computer display control system as set forth in claim 21, further including cursor control means coupled to said computer display control system, said cursor control means controlling the position of a cursor on said monitor;

wherein:

said menu generating program includes means for displaying a first version of said user interface object when said cursor does not overlap said user interface object and for displaying a second, less transparent, version, of said user interface object when said cursor does overlap said user interface object;

wherein said control menu becomes more visually prominent when said cursor overlaps said user interface object.

23. The computer display control system as set forth in claim 22, said first version of said user interface object comprising an image with interleaved transparent and non-transparent pixels having a first percentage of non-transparent pixels;

said second version of said user interface object comprising an image with interleaved transparent and non-transparent pixels having a second percentage of non-transparent pixels that is greater than said first percentage of non-transparent pixels;

whereby said displayed user interface object is less transparent when said cursor overlaps said displayed user interface object.

24. The computer display control system as set forth in claim 21, further including cursor control means coupled to said computer display control system, said cursor control means controlling the position of a cursor on said monitor;

wherein:

said menu generating program includes means for displaying a first version of said user interface object when said cursor is not proximate said user interface object and for displaying a second version of said user interface object when said cursor is proximate said user interface object;

wherein said control menu becomes more visually prominent when said cursor is proximate said user interface object.

25. The computer display control system as set forth in claim 24, said first version of said user interface object comprising an image with interleaved transparent and non-transparent pixels having a first percentage of non-transparent pixels;

said second version of said user interface object comprising an image with interleaved transparent and non-transparent pixels having a second percentage of non-transparent pixels that is greater than said first percentage of non-transparent pixels;

whereby said displayed user interface object is less transparent when said cursor is proximate said user interface object.

* * * * *